US007909121B2

(12) United States Patent  
Voronin et al.

(10) Patent No.: US 7,909,121 B2  
(45) Date of Patent: Mar. 22, 2011

(54) POLYCRYSTALLINE ULTRA-HARD COMPACT CONSTRUCTIONS

(75) Inventors: Georgiy Voronin, Orem, UT (US); Nephi M. Mourik, Provo, UT (US); J. Daniel Belnap, Pleasant Grove, UT (US)

(73) Assignee: Smith International, Inc., Houston, TX (US)

( * ) Notice: Subject to any disclaimer, the term of this patent is extended or adjusted under 35 U.S.C. 154(b) by 205 days.

(21) Appl. No.: 11/971,893

(22) Filed: Jan. 9, 2008

(65) Prior Publication Data

US 2009/0173548 A1   Jul. 9, 2009

(51) Int. Cl.  
*E21B 10/567* (2006.01)

(52) U.S. Cl. ........ 175/435; 175/432; 175/433; 175/434; 175/426; 428/686; 228/121

(58) Field of Classification Search .............. 175/426, 175/433, 434, 435, 432; 428/686; 228/121  
See application file for complete search history.

(56) References Cited

U.S. PATENT DOCUMENTS

| | | | |
|---|---|---|---|
| 4,200,159 A * | 4/1980 | Peschel et al. ............... | 175/428 |
| 4,729,440 A * | 3/1988 | Hall ............................. | 175/107 |
| 4,850,523 A | 7/1989 | Slutz | |
| 4,899,922 A | 2/1990 | Slutz et al. | |
| 5,012,863 A | 5/1991 | Springer | |
| 5,049,164 A | 9/1991 | Horton et al. | |
| 5,373,908 A | 12/1994 | Pastusek | |
| 5,967,249 A | 10/1999 | Butcher | |
| 6,742,611 B1 * | 6/2004 | Illerhaus et al. ............... | 175/433 |
| 7,389,834 B1 | 6/2008 | Kembaiyan | |
| 7,487,849 B2 | 2/2009 | Radtke | |
| 2003/0079916 A1 | 5/2003 | Oldham | |
| 2005/0087371 A1 | 4/2005 | Kembaiyan | |
| 2005/0089440 A1 | 4/2005 | Kembaiyan | |
| 2005/0103533 A1 | 5/2005 | Sherwood, Jr. et al. | |
| 2005/0230156 A1 | 10/2005 | Belnap et al. | |
| 2005/0263328 A1 | 12/2005 | Middlemiss | |
| 2006/0191723 A1 | 8/2006 | Keshavan | |

(Continued)

FOREIGN PATENT DOCUMENTS

EP   0 295 151 A2   12/1988

(Continued)

OTHER PUBLICATIONS

Search Report for corresponding British Patent Application GB 0900061.3 dated Apr. 8, 2009, total 4 pages.

(Continued)

*Primary Examiner* — Giovanna C Wright  
*Assistant Examiner* — Nicole A Coy

(57) ABSTRACT

Polycrystalline ultra-hard compact constructions comprise a polycrystalline ultra-hard compact having a polycrystalline ultra-hard body attached to a substrate. A support member is attached to the compact by a braze material. The support member can have a one-piece construction including one or more support sections. The support member has a first section extending axially along a wall surface of the compact, and extending circumferentially along a portion of the compact. The support member can include a second section extending radially along a backside surface of the compact, and/or a third section extending radially along a front side surface of the compact. In one embodiment, the support member includes a second and/or third section and the compact disposed therein is in an axially compressed state. The support member is interposed between the compact and an end-use device.

29 Claims, 7 Drawing Sheets

U.S. PATENT DOCUMENTS

| | | | |
|---|---|---|---|
| 2007/0056776 | A1 | 3/2007 | Overstreet |
| 2007/0079994 | A1 | 4/2007 | Middlemiss |
| 2007/0102199 | A1 | 5/2007 | Smith et al. |
| 2007/0131459 | A1 | 6/2007 | Voronin et al. |
| 2007/0205023 | A1 | 9/2007 | Hoffmaster |
| 2007/0278017 | A1* | 12/2007 | Shen et al. .................... 175/426 |
| 2008/0029310 | A1 | 2/2008 | Stevens et al. |
| 2008/0128176 | A1 | 6/2008 | Choe |
| 2008/0164070 | A1 | 7/2008 | Keshavan |
| 2008/0230279 | A1 | 9/2008 | Bitler et al. |
| 2009/0173014 | A1* | 7/2009 | Voronin et al. ................. 51/307 |

FOREIGN PATENT DOCUMENTS

| | | |
|---|---|---|
| FR | 2774420 A1 | 8/1999 |
| GB | 2351987 A | 1/2001 |
| GB | 2422394 A | 7/2006 |
| GB | 2427215 A | 12/2006 |
| GB | 2431948 A | 5/2007 |
| SU | 1803518 A1 | 3/1993 |

OTHER PUBLICATIONS

Amendment to Search Report for corresponding British Patent Application GB 0900061.3 dated Aug. 5, 2009, total 4 pages.
Non-Final Rejection dated Sep. 24, 2009 for related U.S. Appl. No. 11/554,896.
Response filed Dec. 22, 2009 to Non-Final Rejection dated Sep. 24, 2009 for related U.S. Appl. No. 11/554,896.
Examination Report dated Feb. 25, 2010 for related application No. GB0621679.0 filed Nov. 1, 2006 (2 pages).
Response dated Jun. 25, 2010 to Examination Report dated Feb. 25, 2010 for related application No. GB0621679.0 filed Nov. 1, 2006.
Notice of Allowance dated Mar. 11, 2010 for related U.S. Appl. No. 11/554,896, filed Oct. 31, 2006 (9 pages).
Search Report dated Mar. 18, 2009 for related application No. GB0900059.7 filed Jan. 5, 2009 (3 pages).
Search Report dated Feb. 21, 2007 for related application No. GB0621679.0 filed Nov. 1, 2006.
Examination Report dated Jul. 28, 2010 for related application No. GB0621679.0 filed Nov. 1, 2006 (1 page).

* cited by examiner

POLYCRYSTALLINE ULTRA-HARD COMPACT CONSTRUCTIONS

FIELD OF THE INVENTION

This invention generally relates to polycrystalline ultra-hard compacts and, more particularly, to polycrystalline diamond compact constructions that have been specially engineered to include a support member to provide improved bond strength when attached to a desired cutting and/or wear device when compared to conventional polycrystalline compacts.

BACKGROUND OF THE INVENTION

Polycrystalline ultra-hard constructions, such as polycrystalline diamond (PCD) materials and PCD elements formed therefrom, are well known in the art. Conventional PCD is formed by subjecting diamond grains to processing conditions of extremely high pressure and high temperature in the presence of a suitable solvent catalyst material, wherein the solvent catalyst material promotes desired intercrystalline diamond-to-diamond bonding between the grains, thereby forming a PCD structure.

The solvent catalyst material can be combined with the diamond grains prior to processing or the solvent catalyst material can be provided from an outside source, e.g., from an adjacent substrate body or the like that contains the solvent catalyst material, by infiltration during processing. The resulting PCD structure produces enhanced properties of wear resistance and hardness, making PCD materials extremely useful in aggressive wear and cutting applications where high levels of wear resistance and hardness are desired.

Solvent catalyst materials typically used for forming conventional PCD include metals selected from Group VIII of the Periodic table, with cobalt (Co) being the most common. Conventional PCD can comprise from 85 to 95% by volume diamond and a remaining amount of the solvent catalyst material. The solvent catalyst material is disposed within interstitial regions of the PCD microstructure that exist between the bonded together diamond grains or crystals.

PCD as used in certain industrial wear and/or cutting applications, such as cutting elements in subterranean drill bits, are provided in the form of a compact comprising the PCD material attached to a substrate. The PCD material is positioned on the substrate at a location to engage the surface to be cut or worn, and the substrate is provided for the purpose of facilitating attachment of the PCD compact to the end use wear and/or cutting device. Conventional PCD cutters comprise a PCD body that is joined with a metallic or cermet substrate, e.g., such as one formed from cemented tungsten carbide. Such conventional PCD compacts are formed by placing a desired substrate next to the diamond grain volume and subjecting the combination to high pressure and high temperature (HPHT) processing.

When used as a cutting element in a drill bit, the PCD compact is attached to a portion of the drill bit by welding or brazing. More specifically, the PCD compact is attached to the drill bit by welding or brazing the substrate portion of the PCD compact to a desired portion of the drill bit. Conventional PCD compacts configured for use as such cutting elements have a generally cylindrical shape. Accordingly, when attached for use with a drill bit, the cylindrical PCD compact substrate is brazed or welded to the desired body portion of the drill bit.

A problem known to exist with such conventional PCD compacts configured as cutting elements for use with subterranean drill bits is that the PCD compacts fracture during the process of drilling, causing the PCD compact to break away from and fall off of the drill bit body. Such fracturing is known to occur at the point of attachment between the PCD compact substrate and the drill bit.

In addition to PCD, another form of polycrystalline diamond conventionally used for its desired properties of wear and/or abrasion resistance is one that is substantially free of the catalyst material used to form the PCD. This type of polycrystalline diamond is known as thermally stable polycrystalline diamond (TSP) because it is also known to have improved thermal properties when compared to conventional PCD. While such TSP materials do provide certain performance advantages, the desired lack of catalyst material makes it difficult to form a compact construction having a substrate attached to the TSP material. The presence of a substrate is desired to facilitate attachment of the construction to an end-use wear and/or cutting device. The substrates for such TSP construction are conventionally attached to the TSP material by welding or brazing, which attachment has shown to be vulnerable to failure in operation.

It is, therefore, desired that polycrystalline ultra-hard constructions be configured in a manner that is specially engineered and designed to provide an enhanced degree of contact between a PCD compact and the wear and/or cutting device to maximize the attachment therebetween, and thereby minimize and/or eliminate the possibility of the PCD compact fracturing or otherwise becoming detached from the wear and/or cutting device during use. It is desired that the PCD compact be configured in a manner that contributes to the overall strength of the PCD compact itself. It is further desired that the polycrystalline ultra-hard constructions be configured in a manner engineered to place the polycrystalline ultra-hard material and substrate attached thereto, in a state of compression to thereby improve the attachment strength between the polycrystalline ultra-hard body and a substrate included in the construction.

SUMMARY OF THE INVENTION

Polycrystalline ultra-hard compact constructions of this invention comprise a polycrystalline ultra-hard compact that includes a polycrystalline ultra-hard body that is attached to a substrate. In an example embodiment, the body can comprise polycrystalline diamond that may or may not be substantially free of a catalyst material. A specially engineered support member is attached to the compact by a braze material, and is configured to provide an improved degree of attachment between the compact and a desired end-use wear and/or cutting device.

The support member can be of a one-piece or unitary construction comprising one or more sections. In an example embodiment, the support member includes a first section that extends axially along a wall surface of the compact and that is configured to accommodate placement of the compact therealong. The first section extends circumferentially around a portion of the compact wall surface, the extent of such circumferential wrap can vary from less than about 50 percent up to 100 percent depending on the support member configuration.

The support member can include a second section that extends radially along a backside surface of the compact, and can further include a third section that extends radially along a front side surface of the compact. The second the third sections can extend radially along from about 30 to 100 percent of the respective compact backside and front side surfaces. In an example embodiment, the support member includes all three sections and the three sections are integral with the support member. Alternatively, the support member may only include one of these sections and/or may include two or more of these sections, wherein one or both of these sections may not be integral with the support member.

The support member may be configured to place the compact in a state of axial compression, which can be achieved when the support member includes a second or third section that extends along a respective compact backside or front side surface. In an example embodiment, such axial compression is achieved during a cooling phase of brazing the compact to the support member when the support member is formed from a material having a thermal expansion characteristic, e.g., a coefficient of thermal expansion, that is greater than that of the compact.

The support member can be attached to the compact by using different braze materials, e.g., active and nonactive braze alloys, depending on the particular compact and/or support member construction and the end-use application. In the case where the support member is provided as a multi-piece component, the different support portions can be formed from different materials. The use of different braze materials and/or different support member portions can be tailored to reduce thermal stress during the process of attaching the compact and support member to achieve an improved attachment strength therebetween.

Polycrystalline ultra-hard compacts constructions of this invention configured in this manner are specially engineered to provide an enhanced degree of contact between a polycrystalline ultra-hard compact and a desired wear and/or cutting device to maximize the attachment strength therebetween. Further, such constructions of this invention can place the compact in a state of axial compression that can improve the attachment strength between the polycrystalline ultra-hard body and substrate of the compact. Both features of such constructions operate to extend the surface life of polycrystalline ultra-hard compacts as used in desired wear and/or cutting operations, when compared to conventional polycrystalline ultra-hard compacts that do not make use of the support member of such constructions.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1A:
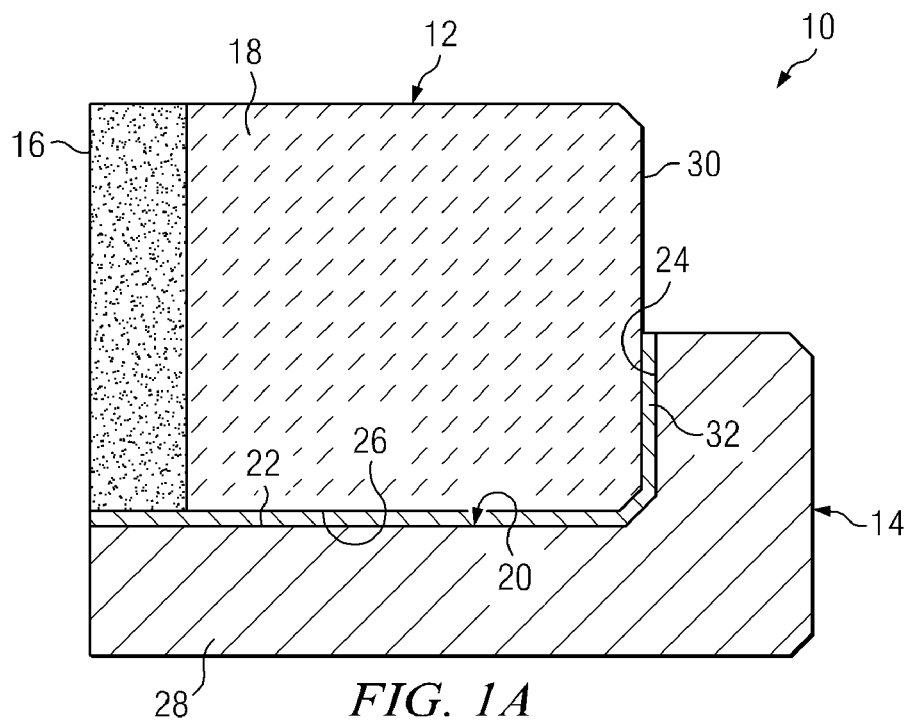
FIGS. 1A, 1B and 1C are cross-sectional side views of example embodiment polycrystalline ultra-hard compact construction of this invention comprising differently configured one-piece support members attached to a polycrystalline ultra-hard compact.

Polycrystalline ultra-hard compact construction of this invention comprise a polycrystalline ultra-hard material body that is joined to a substrate, wherein the joined together body and substrate forms a compact that is further joined to a support member. The support member is specifically engineered to provide an enhanced degree of support to the compact, and an enhanced degree of attachment between the compact and a surface of a wear and/or cutting device. The compact can be attached to the support member using one or more different types of braze materials to further enhance the strength of the construction, and/or the support member comprise two or more elements or sections made from the same or different types of materials to also enhance strength of the construction by controlling or minimizing the residual thermal stress within the construction after brazing.

Thus, polycrystalline ultra-hard compact construction constructed in accordance with principles of this invention comprising such support members provide a structure that can be readily attached to a tooling, cutting and/or wear device, e.g., to a bit used for drilling subterranean formations when the construction is provided in the form of a cutting element, by conventional means such as by brazing and the like.

In an example embodiment, polycrystalline ultra-hard materials used to form the polycrystalline ultra-hard body comprises a material microstructure of bonded-together diamond grains or crystals. In certain embodiments, a portion or the entire polycrystalline ultra-hard material substantially free of a catalyst material used to form the body, or the polycrystalline ultra-hard material may wholly retain the catalyst material.

Polycrystalline ultra-hard compact constructions of this invention are specially designed to provide properties of improved bond strength and reduced residual thermal stress when compared to conventional polycrystalline ultra-hard compacts that do not include the support member, thereby providing improved service life.

As used herein, the term "PCD" is understood to refer to polycrystalline diamond that has been formed, at high pressure-high temperature (HPHT) conditions, through the use of a catalyst material, such as the metal solvent catalysts included in Group VIII of the Periodic table. PCD comprises a polycrystalline phase of bonded-together diamond crystals and catalyst material that is disposed in interstitial regions between the diamond crystals.

Materials useful for forming a polycrystalline ultra-hard body can be selected from materials including diamond, cubic boron nitride (cBN), and mixtures thereof. When the polycrystalline ultra-hard body comprises bonded-together diamond crystals, and the body has not otherwise been treated to remove the solvent catalyst material used to facilitate diamond bonding to form the same, such solvent catalyst material will be disposed in interstitial regions within the intercrystalline diamond microstructure and/or adhered to the surfaces of the diamond crystals.

In an example embodiment, the polycrystalline ultra-hard body comprises intercrystalline bonded diamond that is formed by bonding together adjacent diamond grains or crystals at HPHT conditions, thereby forming polycrystalline diamond (PCD). The bonding together of the diamond grains at HPHT conditions is facilitated by the use of an appropriate catalyst material. In an example embodiment, the catalyst material is a metal solvent catalyst.

Diamond grains useful for forming PCD materials used with polycrystalline ultra-hard compact constructions of this invention include synthetic diamond powders having an average diameter grain size in the range of from submicrometer in size to 100 micrometers, and more preferably in the range of from about 1 to 80 micrometers. The diamond powder can contain grains having a mono or multi-modal size distribution. In an example embodiment, the diamond powder has an average particle grain size of approximately 20 micrometers. In the event that diamond powders are used having differently sized grains, the diamond grains are mixed together by conventional process, such as by ball or attritor milling for as much time as necessary to ensure good uniform distribution.

The diamond grain powder is preferably cleaned, to enhance the sinterability of the powder by treatment at high temperature, in a vacuum or reducing atmosphere. The diamond powder mixture is loaded into a desired container for placement within a suitable HPHT consolidation and sintering device.

The diamond powder may be combined with a desired catalyst material, e.g., a solvent metal catalyst, in the form of a powder to facilitate diamond bonding during the HPHT process and/or the catalyst material can be provided by infiltration from a substrate positioned adjacent the diamond powder. Suitable catalyst materials include metal solvent catalysts such as those selected from Group VIII elements of the Periodic table. A particularly preferred metal solvent catalyst is cobalt (Co).

Suitable substrates useful for both forming the compact and infiltrating the catalyst material can include those used to form conventional PCD materials, including carbides, nitrides, carbonitrides, ceramic materials, metallic materials, cermet materials, and mixtures thereof. A feature of such substrate is that it includes a metal solvent catalyst that is capable of melting and infiltrating into the adjacent volume of diamond powder to facilitate the formation of diamond-to-diamond intercrystalline bonding during the HPHT process. As noted above, suitable metal solvent catalyst materials include those selected from Group VIII elements of the Periodic table. A particularly preferred metal solvent catalyst is cobalt (Co), and a preferred substrate material is cemented tungsten carbide (WC—Co).

Alternatively, the diamond powder mixture can be provided in the form of a green-state part or mixture comprising diamond powder that is contained by a binding agent, e.g., in the form of diamond tape or other formable/confirmable diamond mixture product to facilitate the manufacturing process. In the event that the diamond powder is provided in the form of such a green-state part it is desirable that a preheating step take place before HPHT consolidation and sintering to drive off the binder material. In an example embodiment, the PCD material resulting from the above-described HPHT process may have a diamond volume content in the range of from about 85 to 95 percent.

The diamond powder mixture or green-state part is loaded into a desired container for placement within a suitable HPHT consolidation and sintering device. The HPHT device is activated to subject the container to a desired HPHT condition to effect consolidation and sintering of the diamond powder. In an example embodiment, the device is controlled so that the container is subjected to a HPHT process having a pressure of approximately 5,500 MPa and a temperature of from about 1,350° C. to 1,500° C. for a predetermined period of time. At this pressure and temperature, the solvent metal catalyst melts and infiltrates into the diamond powder mixture, thereby sintering the diamond grains to form conventional PCD.

While a particular pressure and temperature range for this HPHT process has been provided, it is to be understood that such HPHT processing conditions can and will vary depending on such factors as the type and/or amount of metal solvent catalyst used, as well as the type and/or amount of diamond powder used to form the PCD region. After the HPHT process is completed, the container is removed from the HPHT device, and the so-formed PCD compact is removed from the container.

In an example embodiment, the polycrystalline ultra-hard body comprises a generally homogonous construction comprising a polycrystalline material phase and a binder phase. In one such example embodiment, the polycrystalline phase is formed from intercrystalline bonded diamond and the binder phase is formed from the catalyst material used to form the same, wherein the catalyst material is disposed within interstitial regions of the microstructure. Alternatively, the polycrystalline ultra-hard body can be constructed comprising two or more regions, wherein one of the regions includes the binder or catalyst material and another region is substantially free of the binder material. In such alternative embodiment, the target region that is substantially free of the catalyst material can be provided by treating the targeted region so that the catalyst material is removed therefrom.

Further still, the polycrystalline ultra-hard body can be constructed as described above, to form PCD, and then the so-formed PCD can be treated to remove substantially all of the catalyst material from the entire body, thereby resulting in the formation of thermally stable polycrystalline diamond (TSP).

As used herein, the term "substantially free" when used in referring to amount of binder or catalyst material in the polycrystalline ultra-hard body is understood to mean that the catalyst material can actually be removed from a desired region thereof or the entire body, or that the catalyst material remains in the region or the entire body but has been reacted or otherwise treated so that it no longer functions in a catalytic function with respect to the surrounding polycrystalline phase. In an example embodiment the region or entire body that is substantially free of the binder or catalyst material has had the catalyst material removed therefrom by suitable process such as by chemical treatment such as by acid leaching or aqua regia bath, electrochemically such as by electrolytic process, by liquid metal solubility, or by liquid metal infiltration that sweeps the existing catalyst material away and replaces it with another noncatalyst material during a liquid phase sintering process, or by combinations thereof. In an example embodiment, the catalyst material is removed from the targeted region of or the entire polycrystalline ultra-hard body by an acid leaching technique, such as that disclosed for example in U.S. Pat. No. 4,224,380.

In an example embodiment, the polycrystalline ultra-hard body can comprise a first region that is substantially free of the binder or catalyst material, and a second region that includes the binder or catalyst material. In an example embodiment, it is desired that the first region be positioned along a surface of the body that may or may not be a cutting and/or working surface to take advantage of improved thermal stability provided by removal of the catalyst material. In such embodiment, the first region extends from a cutting and/or working surface a desired depth into the body to the second region. The cutting and/or working surface is understood to include any and all portions of the body outer surface, such as the top and/or side surfaces of the body which may or may not actually come into wear or cutting contact during use. Accordingly, it is to be understood that the location of the polycrystalline body region substantially free of the binder or catalyst material can be positioned differently depending on the particular end use wear and/or cutting application.

Generally speaking, polycrystalline ultra-hard compact constructions of this invention comprise a polycrystalline ultra-hard material body that is attached to a substrate, and that is further attached to the support member or to two or more sections of the support member by the use of one or more braze materials. The configuration of the support member, the material used to form the support member or its sections, and the types of braze materials that are used to attach the compact to the support member and/or attach one support member to another support member are specifically engineered to provide a polycrystalline ultra-hard compact construction having improved mechanical bond strength and reduced residual thermal stress when compared to conventional PCD compacts lacking use of such support member.

Figure 1B:
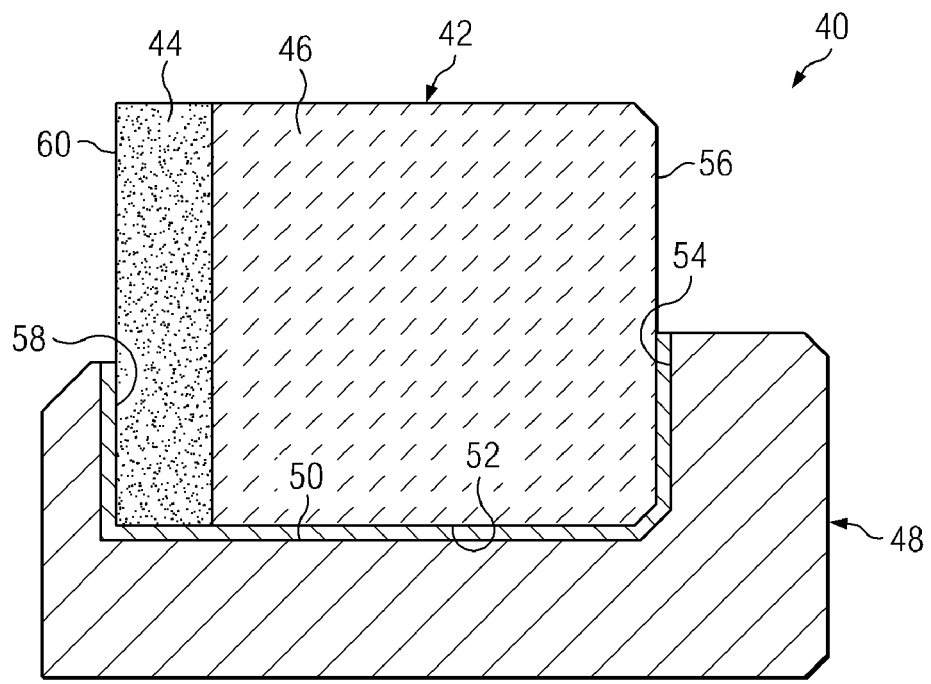

FIGS. 1A and 1B illustrate an example embodiment polycrystalline ultra-hard compact construction 10 of this invention generally comprising a polycrystalline ultra-hard compact 12 that is attached to a support member 14. In an example embodiment, the polycrystalline ultra-hard compact 12 comprises a polycrystalline ultra-hard body 16 that is attached to a substrate 18. The body can be formed from polycrystalline ultra-hard materials described above, and in an example embodiment is formed from polycrystalline diamond materials such as PCD and TSP. The substrate can be formed from the same type of substrate materials described above, and in an example embodiment is formed from cemented tungsten carbide (WC—Co). In an example embodiment, where the construction is designed for use in a cutting device such as in a bit for drilling subterranean formations, the compact 12 is provided in the form of a cutting element, e.g., a PCD cutter.

Referring to FIG. 1A, the support member 14 is a one-piece construction configured having an inside wall portion 20 that includes a first section 22 that extends axially along an outside wall surface 26 of the compact 12 so that it covers an outer side surface of both the body 16 and the substrate 18. The support first section 22 is integral with the support member 14. In an example embodiment, the support first section 22 has an axial length that is approximately the same as the compact 12. The first section 22 is configured having a radius of curvature that complements the outside wall surface of the compact, and has a wall structure 28 that is disposed at least partially around a circumferential portion of the compact outside wall surface 26.

In an example embodiment, it is desired that the support member 14 first section 22 be configured so that it extends circumferentially around from about 10 to 50 percent of the compact outside wall surface, preferably from about 20 to 50 percent, and more preferably from about 40 to 50 percent. If the support member 14 first section 22 extends radially along less than about 10 percent of the compact outside wall surface, it may not provide a desired amount of contacting surface area with the compact to provide a desired improved degree of bond or attachment strength between the compact and the support member for use in certain wear and/or cutting applications. The extent that the support member extends around the compact will depend on the degree of enhanced support that is desired along with the extent that the compact needs to be exposed for purpose of performing a cutting and/or wear operation.

The support member first section 22 is sized axially so that it extends along all or a portion of the compact 12. For example, the support first section 22 can be sized so that it extends axially along the entire outside wall surface 26 of the compact, i.e., covering both the body 16 and the substrate 18. In another example, the support first section 22 can be sized to that it extends axially along a partial portion of the compact outside wall surface 26, e.g., so that it covers all or a portion of the substrate 18 and may not extend to cover the body 16. In an example embodiment, the support member first section 22 is sized axially to extend along the compact body and substrate.

The support member 14 includes a second or back section 24 that extends from an axial end of the first section inside wall portion 20, and that projects radially inwardly a distance therefrom. The second section 24 is integral with the support member. The support member second section 24 is configured to extend along at least a partial portion of a backside surface 30 of the compact 12. In the example embodiment illustrated in FIG. 1A, the support member 14 and its first and second sections are configured as a one-piece/unitary construction, i.e., it is formed from a single piece of suitable material. Alternatively, if desired, the first and second sections of the support member can be formed from separate parts that are connected together by suitable means, e.g., by brazing or the like.

The distance that the support member second section 24 extends radially can and will vary depending on a number of factors such as the type of materials used to form the compact, the specific geometry of the compact, and/or the particular end-use application. In an example embodiment, the support second section 24 extends a distance that is sufficient to provide a desired degree of axial support to the compact, providing a desired improvement in the mechanical strength of the overall construction. In an example embodiment, the support member second section 24 will extend radially to cover at least about 10 percent of the compact backside surface 30, and can extend to cover the entire or 100 percent of the backside surface if such degree of axial support is called for by the end-use application. In example embodiment, the second member extends radially to cover from about 20 to 100 percent of the compact backside surface 30, and more preferably covers in the range of from about 40 to 50 percent of the compact backside surface.

Configured in this manner, the support member first section 22 operates to provide side or lateral support to the outer side portion or side wall surface 26 of the compact 12, and the support second section 24 operates to provide axial support to the backside portion 30 of the compact 12, thereby together operating to increase the overall attachment strength of the compact within the construction and in turn increase the attachment strength of the compact to the desired cutting and/or wear device.

The first and second sections of the support member 14 are attached to respective adjacent outside surface portions of the compact 12 by brazing technique through the use of a suitable braze material 32. The type of braze material that is used to attach the compact to the support member can and will vary depending on such factors as the types of materials used to form the compact, e.g., the body and the substrate material, and/or the type of material used to form the support member.

Braze materials useful for forming polycrystalline ultra-hard compact constructions of this invention include those selected from the group comprising Ag, Au, Cu, Ni, Pd, B, Cr, Si Ti, Mo, V, Fe, Al, Mn, Co, and mixtures and alloys thereof. Alloys comprising two or more of the above-identified materials are especially desired and useful for this purpose. Brazing materials useful for attaching the compact to the support member include those characterized as being "active" and "nonactive." "Active" braze materials are those that react with the polycrystalline ultra-hard material, and for this reason are preferably used for attaching the body portion of the compact to the support member, while "nonactive" braze materials are those that do not necessarily react with the polycrystalline ultra-hard material, and for this reason may be useful for attaching the substrate portion of the compact to the support member. While the above preferred uses of "active" and "nonactive" braze materials have been described, it is to be understood that this is a preferred use and that the braze materials described herein can be used to attach the polycrystalline ultra-hard compact to the support member.

Example "active" braze materials useful for forming polycrystalline ultra-hard compact constructions of this invention include those having the following composition and liquidus temperature (LT) and solidus temperatures (ST), where the composition amounts are provided in the form of weight percentages:
81.25 Au, 18 Ni, 0.75 Ti, LT=960° C., ST=945° C.;
82 Au, 16 Ni, 0.75 Mo, 1.25 V LT=960C.°, ST=940° C.;
20.5 Au, 66.5 Ni, 2.1 B, 5.5 Cr, 3.2 Si, 2.2 Fe, LT=971° C., ST=941° C.;
56.55 Ni, 30.5 Pd, 2.45 B, 10.5 Cr, LT=977° C., ST=941° C.;
92.75Cu, 3 Si, 2 Al, 2.25 Ti, LT=1,024° C., ST=969° C.;
82.3 Ni, 3.2 B, 7 Cr, 4.5 Si, 3 Fe, LT=1,024° C.; ST=969° C.; and
96.4 Au, 3 Ni, 0.6 Ti, LT=1,030° C., ST=1,003° C.

Example "nonactive" braze materials useful for forming polycrystalline ultra-hard compact constructions include those having the following composition and liquid temperature (LT) and solid temperature (ST), where the composition amounts are provided in the form of weight percentages:
52.5 Cu, 9.5 Ni, 38 Mn, LT=925° C., ST=880° C.;
31 Au, 43.5 Cu, 9.75 Ni, 9.75 Pd, 16 M, LT=949° C., ST=927° C.;
54 Ag, 21 Cu, 25 Pd, LT=950° C., ST=900° C.;
67.5 Cu, 9 Ni, 23.5 Mn, LT=955° C., ST=925° C.;
58.5 Cu, 10 Co, 31.5 Mn, LT=999° C., ST=896° C.; 35 Au, 31.5 Cu, 14 Ni, 10 Pd, 9.5 Mn, LT=1,004° C., ST=971° C.;
25 Su, 37 Cu, 10 Ni, 15 Pd, 13 Mn, LT=1,013° C., ST=970° C.; and
35 Au, 62 Cu, 3 Ni, LT=1,030° C., ST=1,000° C.

As noted above, braze materials useful for forming polycrystalline ultra-hard compact constructions can be active and react with the polycrystalline ultra-hard material used to form the compact. In an example embodiment, where such an active braze material is used, the braze material can react with the polycrystalline ultra-hard material to form a reaction product therein and/or between it and the adjacent support member. The presence of such reaction product can operate to enhance the thermal and/or mechanical properties of the polycrystalline ultra-hard material. For example, where the braze material includes silicon or titanium and the polycrystalline ultra-hard material comprises a polycrystalline diamond ultra-hard phase, the silicon or titanium in the braze material reacts with the carbon in the diamond to form SiC or TiC.

In addition to the properties of being active or nonactive, braze materials used to form polycrystalline ultra-hard compact constructions of this invention can be selected based on their characteristic liquid (liquidus) or solid/crystallization (solidus) temperatures, as will be described in greater detail below, for the purpose of facilitating forming the constructions in a manner that intentionally reduces or eliminates the formation of voids and/or residual thermal stresses in the resulting construction. Additionally, when constructions of this invention are to be attached to an end-use application device by welding or brazing technique, it is also desired that the braze material selected be one having a liquidus temperature that is higher than the welding or brazing temperature used to attach the construction to the end-use device. For example, where the construction is provided in the form of a cutting element for attachment on a bit for drilling subterranean formations, it is desired that the braze material have a liquidus/solidus temperature that is above that used to join conventional cutting elements, e.g., having a PCD body and a WC—Co substrate, to such drill bits.

The support member used for forming polycrystalline ultra-hard compact constructions of this invention can be formed from the same types of materials disclosed above used for forming substrates for conventional PCD compacts. In an example embodiment, the support member can be formed from a cermet material such as WC—Co.

A feature of the polycrystalline ultra-hard construction 10 illustrated in FIG. 1A is that the support member 14 extends both axially, circumferentially and radially around respective portions of the compact 12, thereby providing a desired degree or reinforcement to the compact to improve the strength of the compact, and to improve the attachment strength between the compact and the support when the overall construction is attached to an end wear and/or cutting device and placed into operation.

Figure 1C:
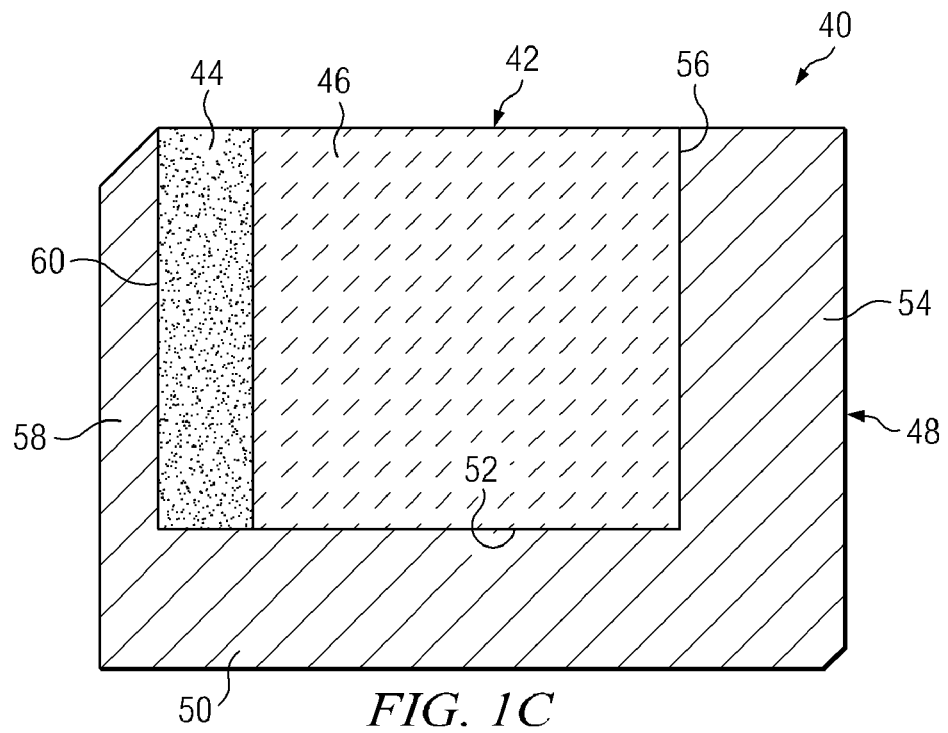

FIGS. 1B and 1C illustrate other example embodiment polycrystalline ultra-hard compact constructions 40 of this invention comprising the same general elements of a compact 42 having a polycrystalline diamond body 44, e.g., formed from PCD or TSP, attached to a substrate 46. A support member 48 is attached to the compact 42 and includes an integral first section 50, that extends axially along an outside wall surface 52 of the compact and that covers a desired circumferential portion of the compact outside wall surface, and an integral second section 54 that extends radially away from an end portion of the first section to cover at least a portion of the compact backside surface 56.

Additionally, the support member 48 of this example embodiment includes an integral third or front section 58 that extends radially from an opposite end of the axially extending support first section 50. The support member third section 58 is designed to extend radially along and cover at least a portion of the compact front side surface 60, which surface is defined by the compact body 44.

The extent that the support member third section 58 extends radially along the compact front side surface can and will vary depending on a number of factors such as the type of materials used to form the compact, the specific geometry of the compact, and/or the particular end-use application. In an example embodiment, the support member third section 58 will extend radially to cover at least about 10 percent of the compact front side surface 60, preferably in the range of from about 20 to 100 percent of the compact front side surface, and more preferably in the range of from about 30 to 100 percent of the compact front side surface.

In a preferred embodiment, the support third section is sized so that it functionally provides a desired degree of support to the compact while at the same time exposing a sufficient amount of the compact body front side surface 60 to produce a sufficient working surface for the particular wear and/or cutting application.

Configured in this manner, the support member 48 operates to not only provide side or lateral support for the compact 42, via the support member first section 52, but the combined second or back section 54 and third or front section 58 operate to provide axial support for the compact. Thus, a feature of this invention embodiment is that the third section operates to further enhance and stabilize the attachment between the compact and the support member (both axially and radially), thereby helping to improve the attachment strength and service life of the compact portion of the construction 40. Further, when placed in certain end-use applications such as drilling or the like, the presence of the support member third section 58 can operate to shield the front side surface 60 of the compact 442 from some types of impacts, such as when encountering downhole junk/debrazed cutters or the like.

Further, the support member 48 of this embodiment, comprising the back and front support sections, can be specially engineered to not only provide an improved degree of axial support for the compact but can operate to impose a compressive force on the compact, or place the compact disposed axially between the back and front support sections in a state of compression. Placing the compact in a state of axially directed compression may be desired for compact constructions having a polycrystalline ultra-hard material/substrate attachment that could benefit from having an enhanced attachment strength. For example, when the polycrystalline ultra-hard material body is TSP and the substrate forming the compact is brazed or welded thereto, the placement of this compact in a state of compression by the support member can operate to extend the service life of the compact by reducing the chance of failure due to delamination between the substrate and the body.

The support member of this embodiment can be constructed to place the compact in a state of compression by forming the support member from a material having a thermal expansion property, e.g., a coefficient of thermal expansion, that is greater than that of the compact, so that the support member expands and contracts in an amount that is relatively greater than that of the compact. As described in greater detail below, during the process of attaching the compact to the support member, the temperature of the assembly is increased to the temperature of the braze material selected to form the attachment therebetween.

During the heating stage, the support member expands in an amount that is greater than the compact. Once the braze material is melted, the assembly is allowed to cool, thereby forming the desired attachment bond between the support member and the compact. During the cooling stage, the support member contract in an amount that is greater than the compact, thereby through the presence of the support front and back sections operating to place the compact in a state of axial compression, which compression operates to improve the strength of the attachment between the compact body and the substrate.

FIG. 1C illustrates a particular embodiment of the polycrystalline ultra-hard compact construction 40 of this invention where the support member 48 is configured comprising front and back support sections 58 and 54 that are sized to cover a substantial amount of the compact front and backside surfaces 60 and 56, thereby operating to place the compact 42 in a desired state, e.g., an optimal amount, of axial compression suitable for particular wear and/or cutting applications.

Figure 1D:
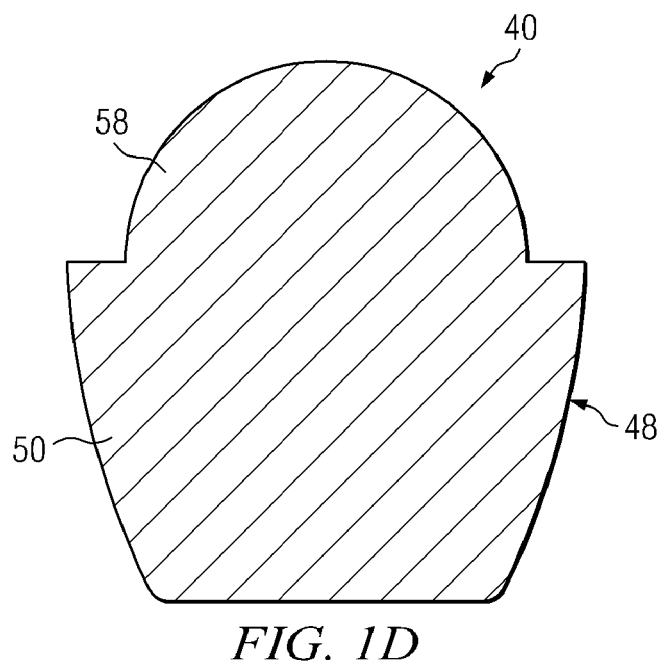
FIG. 1D is a front view of the example embodiment polycrystalline ultra-hard compact construction of FIG. 1C.

FIG. 1D is a front view of the construction embodiment of FIG. 1C that illustrates the extent to which the support member first section extends circumferentially around of the compact wall surface, and that illustrates how the support member front section operates to cover the compact front side surface. It is to be understood that the embodiments illustrated in FIGS. 1C and 1D are provided for purposes of reference, and that embodiments of constructions comprising support members with first, second and third support sections configured differently that that illustrated therein are intended to be within the scope of this invention. For example, while FIGS. 1C and 1D show the support member front section covering the compact front side surface, it is to be understood that the front section can be configured to expose a portion of the compact front side surface sufficient to provide a desired working surface.

The support member 48 illustrated in the example embodiments of FIGS. 1B, 1C and 1D include first, second, and third sections that are integral with one another, i.e., that are formed from the same material and that have a one-piece construction. Additionally, the materials that are used to form the different elements of the construction 40 of this example embodiment can be the same as those described above for similar elements of the example embodiment construction illustrated in FIG. 1A.

Figure 2A:
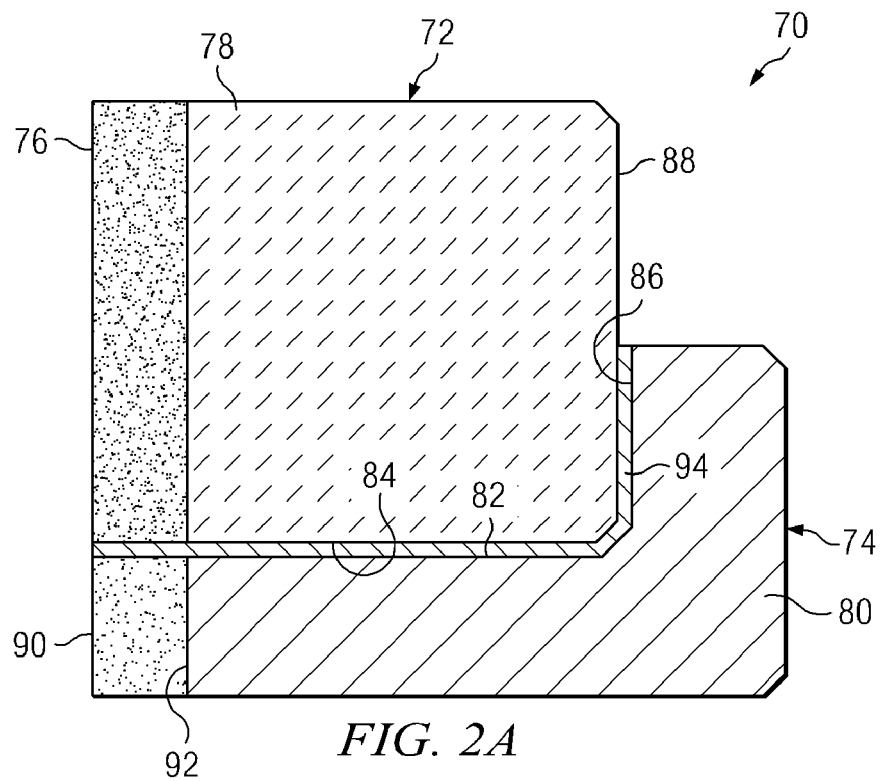
FIGS. 2A and 2B are cross-sectional side views of example embodiment polycrystalline ultra-hard compact constructions of this invention comprising different multi-piece support members attached to a polycrystalline ultra-hard compact.

FIG. 2A illustrates an example embodiment polycrystalline ultra-hard compact construction 70 of this invention that is somewhat similar to that described above and illustrated in FIG. 1A in that it includes a compact 72 that is attached to a support member 74, wherein the compact comprises a polycrystalline ultra-hard material body 76 that is attached to a substrate 78. However, unlike the integral or one-piece construction of the support member presented in FIG. 1A, the support member 74 of this construction embodiment comprises two portions that are not integral with one another, i.e., the support member is of a two-piece construction.

Specifically, the support member 74 includes a first portion 80 that makes up a majority of the support member and that includes a first section 82 that extends axially along an outside wall surface 84 of the compact, and a second section 86 that extends radially along a backside surface 88 of the compact The extent that the support member first section 82 circumferentially covers the compact, and the extent that the support member second section 86 radially covers the compact, can be the same as that described above for the construction example illustrated in FIG. 1A.

In this particular construction embodiment, the first section 82 extends axially along only the compact substrate 78, and does not extend axially to cover an outside wall surface of the compact body 76. Rather, the support member 74 includes a second portion 90 that is configured to be attached to an axial end 92 of the support member first member 80 and that extends axially therefrom to cover an outside wall surface of the compact body 76. The second portion 90 can extend axially partially or wholly along the compact body 76 depending on the particular end-use application, and in a preferred embodiment extends along the entire length of the compact body.

This example embodiment makes use of a two-piece support member 74 for the purpose of more closely matching the wear resistance, thermal expansion, and elastic moduli properties of the particular compact elements, e.g., the body or the substrate, that the respective support member portions will be attached to. For example, when the compact body 76 is PCD and the compact substrate 78 is WC—Co, it may be desired to use a two-piece support member as illustrated in FIG. 2A, wherein the second portion 90 can be formed from a material having a relatively low cobalt content, to more closely match the wear resistance, thermal expansion, and elastic moduli properties of the PCD. In such example, the first portion 80 can be formed from a material having a relatively higher cobalt content, to both provide properties of strength and fracture toughness to the construction, and to also ensure a good weld or braze attachment with the end-use cutting and/ or wear device. In an example embodiment, the support member first and second portions 80 and 90 can be formed from WC—Co, wherein the WC—Co material used to form the first member can have a cobalt content that is greater than that of the second member.

In another example embodiment, the support member 74 can comprise first and second portions that are formed from the same types of material used to form the compact substrate and body that will be attached thereto. In an example where the compact comprises a PCD body attached to a WC—Co substrate, the support member first section can be formed from WC—Co and the support member second section can be formed from PCD. Additionally, the support member portions can be joined together by HPHT process. Further, the support member 74 can be formed from a relatively larger-sized compact that has been configured, e.g., by machining process of the like, to accommodate placement of the polycrystalline ultra-hard compact therein. For example, when the polycrystalline ultra-hard compact comprises a PCD body bonded to a WC—Co substrate, the support member can be formed from a larger diameter compact also comprising a PCD body bonded to a WC—Co substrate, so that the support member first portion is formed from the WC—Co substrate, and the support member second portion is formed from the PCD body. Thus, when the polycrystalline ultra-hard compact is fitted/nested within such a support member, the compact PCD body is positioned adjacent the support member PCD second portion, and the compact WC—Co substrate is positioned adjacent the support member WC—Co first portion.

The materials used to form the remaining elements of the construction 70 of this example embodiment can be the same as those described above for similar elements of the example embodiment construction illustrated in FIG. 1A.

Figure 2B:
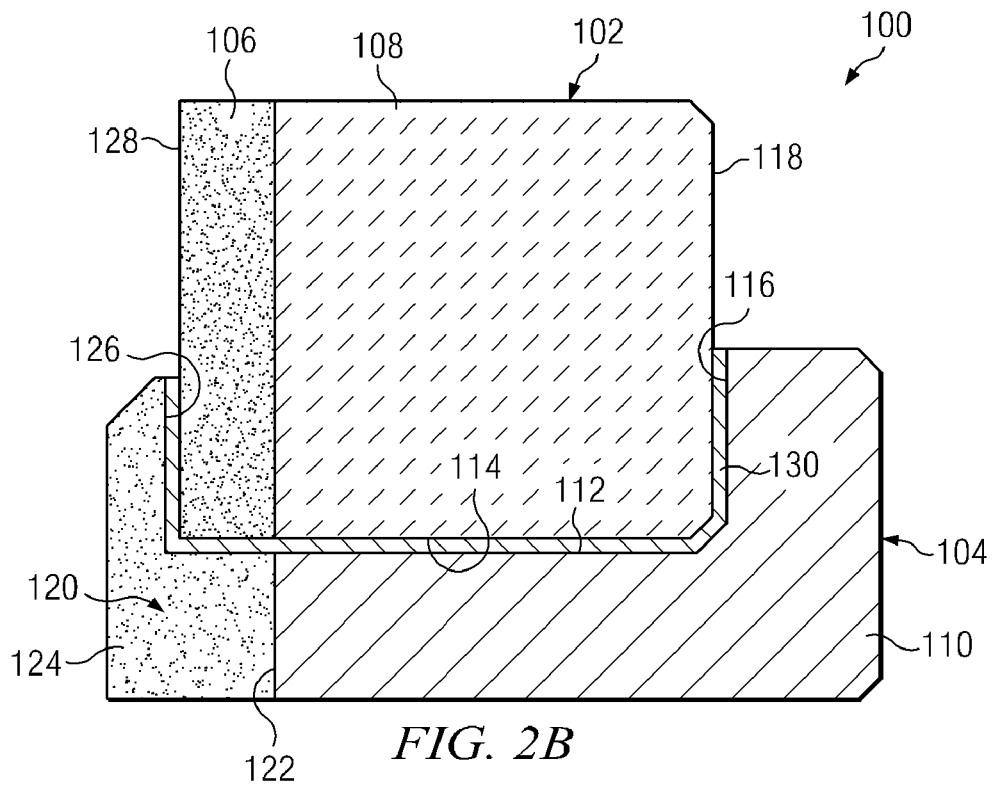

FIG. 2B illustrates an example embodiment polycrystalline ultra-hard compact construction 100 of this invention that is somewhat similar to that described above and illustrated in FIG. 1B in that it includes a compact 102 that is attached to a support member 104, wherein the compact comprises a polycrystalline ultra-hard material body 106 that is attached to a substrate 108. However, unlike the integral or one-piece construction of the support member presented in FIG. 1B, the support member 104 of this construction embodiment has a multi-piece construction. Specifically, the support member 104 includes a first portion 110 that makes up a majority of the support member and that includes a first section 112 that extends axially along an outside wall surface 114 of the compact 108, and a second section 116 that extends radially along a backside surface 118 of the compact. The extent that the support member first section 112 circumferentially covers the compact, and the extent that the support member second section 116 radially covers the compact, can be the same as that described above for the construction example illustrated in FIG. 1A.

In this particular construction embodiment, the first section 112 extends axially along only the compact substrate 108, and does not extend axially to cover an outside wall surface of the compact body 106. Rather, the support member 104 includes a second portion 120 that is configured to be attached to an axial end 122 of the support member first member 110 and that includes a section 124 that extends axially therefrom to cover an outside wall surface of the compact body 106. Unlike the support member second portion illustrated in FIG. 2A, the second portion 120 of this invention embodiment comprises a third section 126 that extends radially from the second portion 120 to cover part of all of the compact front side surface 128. The extent that the support second member third section 126 covers the compact front side surface can be the same as that described for the invention embodiment illustrated in FIG. 1B. The support member third or front section 126 operates with the second section 116 to provide an improved degree of axial support to the compact 102 than that provided in the example embodiment illustrated in FIG. 2A, which may desired in certain end-use applications.

As described above, the support member first and second portions 110 and 120 illustrated in FIG. 2B can be formed from different materials like those described above for the same reasons as already presented for the invention embodiment illustrated in FIG. 2A, i.e., the first and second members can be formed from materials having properties that are closely matched to those of the section of the compact that they are positioned adjacent. For example, the materials selected to form the support first and second portions may be chosen for the purpose of more closely matching the wear resistance, thermal expansion, and/or elastic moduli properties of the compact sections that each respective support member will be attached to. As described above for the example embodiment illustrated in FIG. 2A, the support member of FIG. 2B can also be formed from a relatively larger compact, comprising the same body and substrate as the polycrystalline ultra-hard compact, and that is configured by machining process of the like to facilitate placement/nesting of the polycrystalline ultra-hard compact therein.

Additionally, the support member of FIG. 2B can be formed from materials that operate to place the polycrystalline compact 102 disposed therein in a desired state of axial compression. In an example embodiment, the support member 104 for such purpose would be formed from materials having a property of thermal expansion that is greater than that of the polycrystalline ultra-hard compact for the reasons described above for the embodiment of FIGS. 1B, 1C and 1D.

Further, the support member embodiment illustrated in FIG. 2B can additionally be configured such that the support member second and third sections extend along approximately 100 percent of the compact respective back and front side surfaces, as illustrated in FIGS. 1C and 1D.

The materials used to form the remaining elements of the construction 100 of this example embodiment can be the same as those described above for similar elements of the example embodiment construction illustrated in FIG. 1A.

The support member first and second portions of the invention embodiment illustrated in FIGS. 2A and 2B are attached to adjacent surfaces of the respective compact body and compact substrate by use of a braze material 94 and 130 respectively. The braze material used to attach the support member first portion to its respective part of the compact can be the same or different from that used to attach the support member second portion to its respective part of the compact. Additionally, the braze material that is used to attach the support member first and second portions together can be the same as or different from that used to attach the first and second portions to the compact. The support member first and second portions can be attached to one another, e.g., by brazing process, prior to or after one or both have been attached to respective parts of the compact. Alternatively, in the event that the support member itself is formed from a polycrystalline ultra-hard compact, that has been specially configured to accommodate the compact therein, the support member first and second portions will have been attached to one another by the HPHT process used to sinter and form the compact.

Although the polycrystalline ultra-hard compact construction embodiments illustrated in FIGS. 1A, 1B, 1C, 2A and 2B display an interface between the compact and the support member as being planar, i.e., having a continuous and uninterrupted surface configuration, it is to be understood that the interface between the compact and the support member and/or between the different portions or sections of a support member, i.e., in the case where the support member is of a multi-piece construction, can be of a nonplanar configuration depending on such factors as the types of materials used to form the compact and the support members, the types of braze materials used to attach the support members and the compacts, as well as the particular end-use application for the construction of this invention.

For example, the invention embodiment of FIG. 1A illustrates a compact-support member interface characterized by continuous axially directed (having a constant diameter) and/or radially directed (having a planar surface) interfacing surfaces. However, if desired, the interface between the respective compact sections and the first and/or second section of the support member can be nonplanar, and can be characterized by noncontinuous, irregular, and/or interrupted surface features or the like, depending on the factors noted above. In situations where a greater degree of mechanical strength is desired between the attached compact and the support member, it may be desired that the interface therebetween be configured having nonplanar surface features to provide an increased attachment surface area.

As described above, the type of braze material that is used to form the polycrystalline ultra-hard compact constructions of this invention can be the same throughout the construction or can be different for the same reasons described above. Additionally, the different members of multi-part support members used to make the construction (as illustrated in FIGS. 2A and 2B) can be formed from the same or different types of materials as described above for the other multi-part support member construction example embodiments. Additionally, the interface surfaces between the different sections of the compact and support member can be planar or nonplanar, depending on the particular end use application.

Figure 3A:
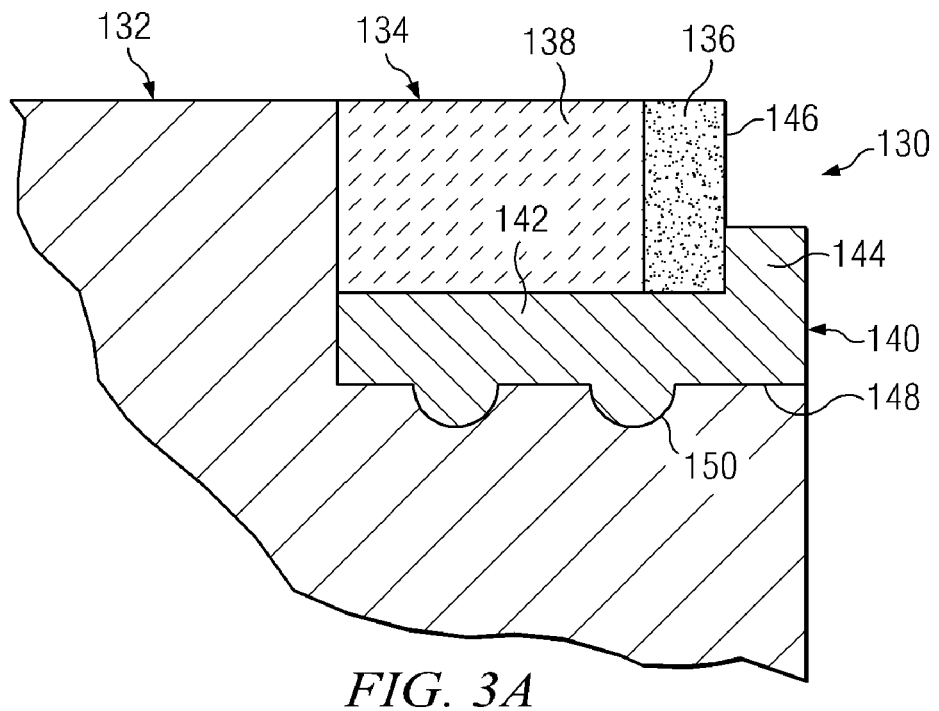
FIGS. 3A and 3B are respective cross-sectional side and front views of an example embodiment polycrystalline ultra-hard compact construction of this invention comprising a polycrystalline ultra-hard compact attached to a support member, as attached to an end use device.
Figure 3B:
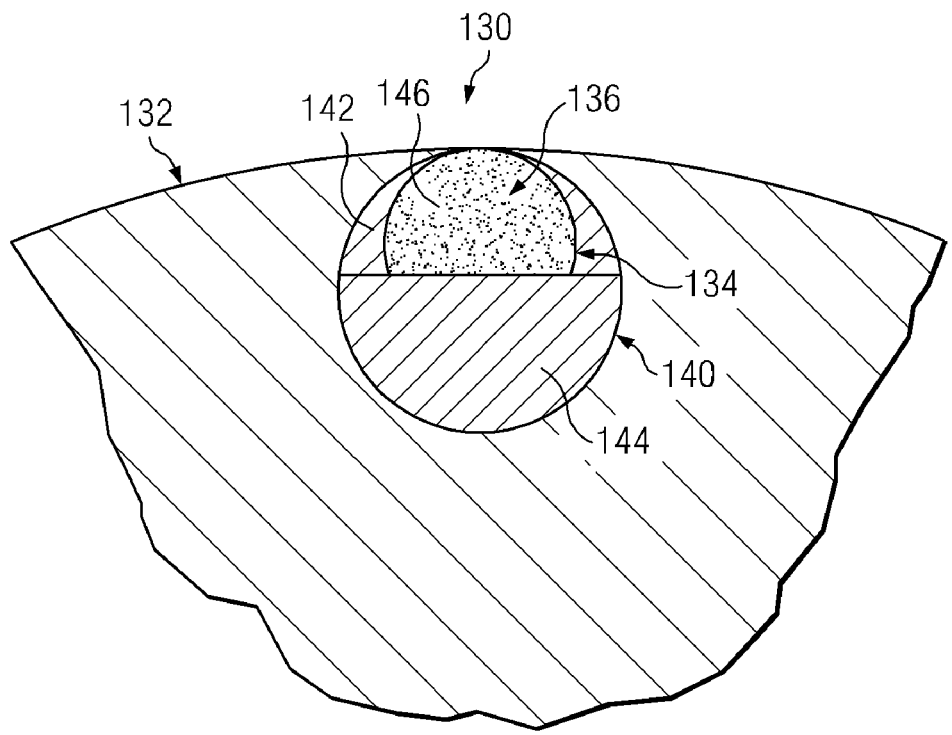

FIGS. 3A and 3B illustrate an example embodiment polycrystalline ultra-hard compact construction 130 of this invention as attached to an end-use device 132. The construction 130 comprises a compact 134, having a polycrystalline ultra-hard body 136 attached to a substrate 138, wherein the compact is attached to a support member 140. In an example embodiment, the compact is configured in the form of a cutting element, e.g., a shear cutter, for use with a drill bit, and comprises a PCD body attached to a WC—Co substrate.

The support member 140 includes a first section 142, that extends axially along a length of the compact and that extends circumferentially around a major portion of the compact as best illustrated in FIG. 3B. Configured in this manner, the support member first section operates to provide an enhanced degree of attachment strength to the compact. Unlike the support members illustrated in FIGS. 1A, 1B, 1C, 2A and 2B, the support member 140 of this particular embodiment does not include a second section extending radially along a backside surface of the compact. Accordingly, it is to be understood that support members as used with compacts to form constructions of this invention may or may not include such second section, and the presence of such will depend on, inter alia, the end-use application.

The support member 140 of this embodiment includes a front support section 144 that extends radially inwardly from an end of the first support section 142 positioned adjacent a front side surface 146 of the compact PCD body 136. The front section 144 is sized to cover a desired portion of the PCD body front side surface as described above. The first and front support sections are integral with one another and the support member of this example embodiment is of a one-piece construction. However, it is to be understood that the support member can just as easily be a multi-piece construction as discussed above.

The support member 140 illustrated in this invention embodiment has a nonplanar outside surface 148 for the purpose of providing an enhanced mechanical attachment with the adjacent surface of the end-use device, e.g., by welding or brazing technique. In an example embodiment, the support outside surface 148 is configured having one or more surface features 150 that are designed to provide an enhanced mechanical fit between the support and the end-use device to increase the mechanical strength of the attachment therebetween. In this example, the surface features are provided in the form of projections configured to cooperate with complementary features in the adjacent surface of the end-use device. However, it is to be understood that the exact configuration of the nonplanar interface and/or number of support surface features provided to produce the same can and will vary within the scope of this invention.

FIG. 3B illustrates the extent to which the support member 140 can be configured to provide radial or lateral support to the compact 134 when attached to an end-use device. In this particular example, the support member first section 142 is configured to extend circumferentially around a substantial portion of the element outside surface, e.g., along more than 50 percent of the compact circumferential surface. In an example embodiment, the support member first section can be constructed to extend circumferentially around about 50 to 100 percent of the compact wall surface, the extent depending on the end-use application.

Accordingly, it is to be understood that for support member configurations having one of a second or third section, the support member may be configured with a first section that provides greater than a 50 percent circumferential wrap and is not limited by the technique of placing the compact therein, i.e., with only one of a support second or third section, the compact can be inserted axially within the support member. With support members configured having both a second and third section, the first section wrap is limited to 50 percent because of the limitation involved in placing/loading the compact radially within the support member.

In the example embodiment of FIGS. 3A and 3B, the support member first section 142 is configured having a decreasing radial thickness as it approaches a section of the compact that is generally aligned with an edge portion of the end use device. This can be achieved, for example, by forming a hole through the support member having an axis that is offset from the that of the support member.

Figure 4A:
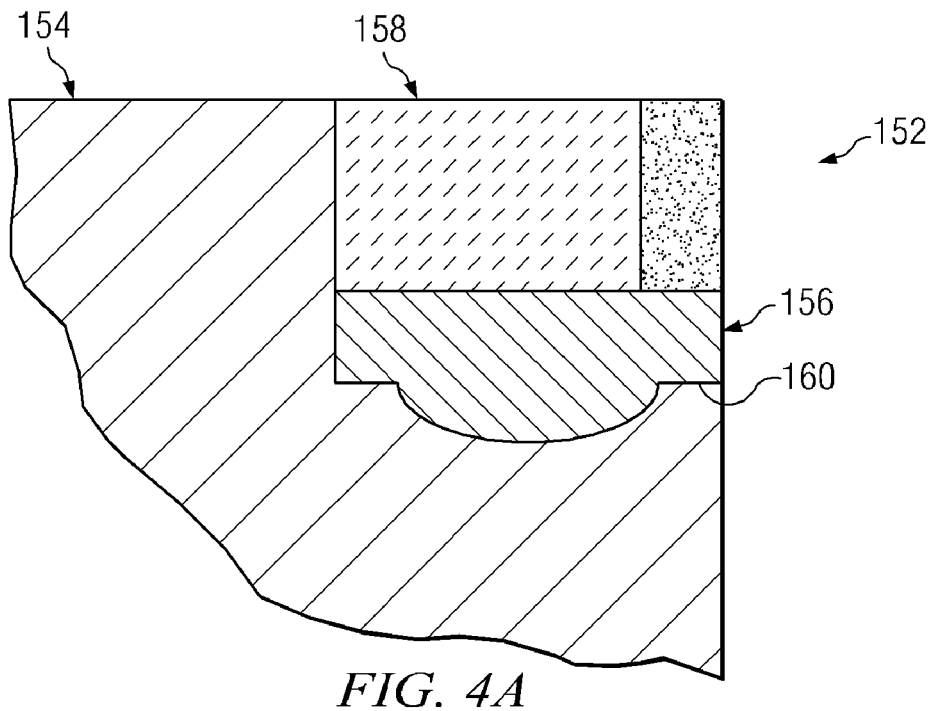
FIGS. 4A and 4B are respective cross-sectional side and top front views of another example embodiment polycrystalline ultra-hard compact construction of this invention, comprising a polycrystalline ultra-hard compact attached to a support member, as attached to an end use device.
Figure 4B:
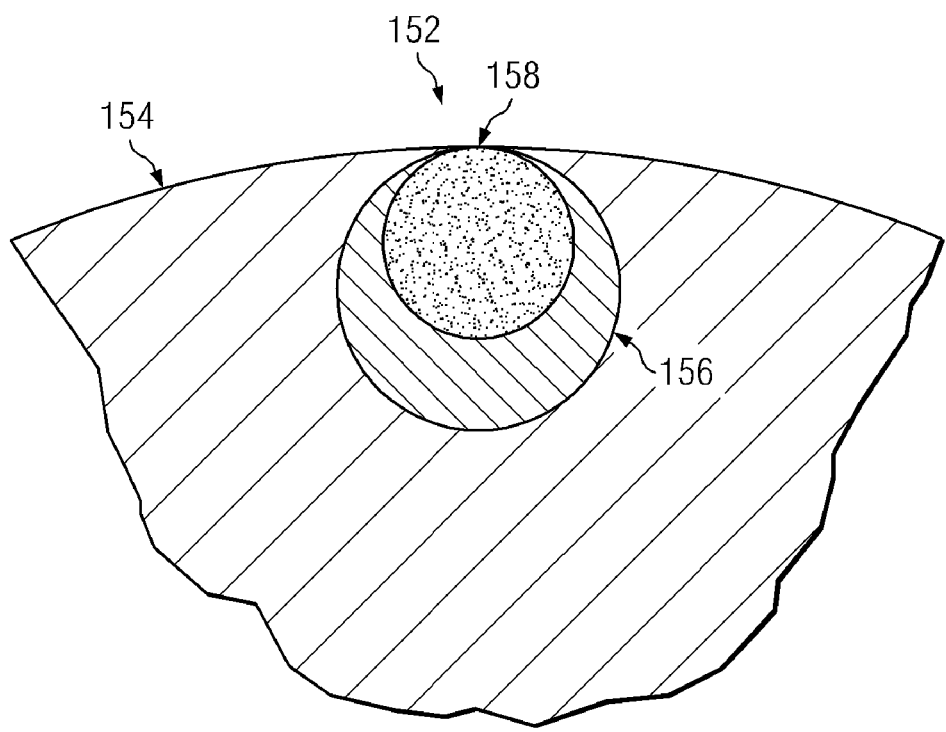

FIGS. 4A and 4B illustrate an example embodiment polycrystalline ultra-hard compact construction 152 of this invention as attached to an end-use device 154. The construction 152 is similar to that illustrated in FIGS. 3A and 3B except that the support member 156, that is attached to the compact 158, lacks a front section covering a portion of the compact front side surface. The construction 152 is somewhat similar to that described above and illustrated in FIG. 3A in that the support member 156 also does not include second section that extends radially inwardly along the compact backside surface. Like the construction embodiment illustrated in FIGS. 3A and 3B, the support member 156 of this construction embodiment 152 also has a nonplanar outside surface 160 for the purpose of providing an enhanced mechanical attachment with the adjacent end-use device, e.g., by welding or brazing technique. Further, like the embodiment of FIGS. 3A and 3B, the support member 156 comprises a first section that wraps circumferentially around a majority of the compact wall surface.

Polycrystalline ultra-hard compact constructions of this invention can include a compact having a polycrystalline ultra-hard material body configured in the form of a tablet having a cylindrical outside wall surface with a defined radius, and having a defined thickness. It is to be understood that the radial and axial dimensions of the polycrystalline ultra-hard material body can and will vary depending on the particular tooling, cutting and/or wear application. In an example embodiment, for purposes of reference, the polycrystalline ultra-hard body can have a diameter in the range of from about 9 mm to 22 mm, although there are niche applications for body diameters of from about 6 mm and 26 mm as well. Example embodiment constructions of this invention can comprise polycrystalline ultra-hard bodies within the above-noted diameter ranges and having an axial thickness of from about 0.5 mm to 4.0 mm. Again, it is to be understood that these ranges are provided only for purposes of reference and example and are not intended to be limiting of polycrystalline ultra-hard compact constructions of this invention.

The compact substrate that is attached to the polycrystalline ultra-hard material body preferably has a diameter that is the same or very close to that of the body, and that has an axial length that operates to both provide a desired degree of support to the body and provide a desired degree of attachment surface to the support member. It is to be understood that the exact radial and axial dimensions of the substrate can and will vary depending on the particular cutting and/or wear application.

The type of braze materials that are used to attach the compact to the support member and/or different members or sections of the support member together can and will vary depending on such factors as the types of materials used to form the compact and/or the types of material used for to form the support member and/or support member sections or elements.

A feature of the polycrystalline ultra-hard compact constructions of this invention is that the support member first section extends circumferentially around a portion of the compact outside wall surface. The interface geometry provided along the interface between the support member and compact is well suited for certain cutting and/or wear applications calling for a high degree of bond strength with the compact. The adjacent surfaces of the compact and the support member first section are therefore configured in a manner that provides a high degree of surface area along the interface to further enhance the bond strength therebetween. Additionally, this interface configuration may provide some compressive radial residual stresses that could operate to enhance cutter performance.

Polycrystalline ultra-hard compact constructions of this invention comprise a support member formed from one or more support sections that are specially configured to attach with the compact to help improve the bond strength of the compact body within the construction and to the end-use wear and/or cutting device. The support members may include sections that are configured to extend radially along one or more of the compact front and back side surfaces to provide an improved degree of axial support and/or to place the compact in a state of compression to further improve the attachment strength with the compact and between the compact body and substrate.

Where the support member is provided as a multi-piece construction, the support sections are configured to both fit together with one another and with the compact in manner that enables movement of the support member sections relative to one another and relative to the compact during the attachment process to avoid the formation of any unwanted gaps or voids, thereby operating to minimize or eliminate the unwanted presence of residual thermal stresses that could otherwise exist within the construction, and to minimize or eliminate the presence of any unwanted stress concentrations within the construction that can occur during end-use operation.

For example, in the polycrystalline ultra-hard compact construction embodiments described above and illustrated FIGS. 2A and 2B, the compact is attached to a support member comprising at least two separate support sections. The use of a support member comprising two or more support sections that are movable relative to one another and relative to the compact during the attachment process operates to minimize or eliminate the formation of unwanted residual thermal stresses in the construction that can be created during the attachment process. When the attachment between the support member sections and/or the compact is provided by a braze material during a brazing process, the braze material is known to undergo a certain degree expansion. Using a support member having two or more support sections in forming constructions of this invention enables a desired degree of movement to take place amongst the compact and support member sections during the brazing process to thereby avoid or minimize formation of unwanted thermal stresses within the resulting assembled construction.

As mentioned briefly above, if desired, the support member first section can comprise two or more support portions, i.e., side support sections. The use of such two-piece side support member operates to further improve the attachment strength between the compact within the construction. Additionally, when the support member further includes a separate front or back support section, the use such further separate support sections operates to further improve the degree to which the support member sections can move relative to one another and relative to the compact body during the brazing process, thereby further enhancing the ability to minimize or eliminate the occurrence of unwanted residual thermal stress within the resulting construction. Additionally, the use of a multi-piece support member permits the use of a variety of different mechanical interlocking features between the different support member portions and/or the compact, filter enhancing the degree of attachment strength that can be gained by this invention.

Polycrystalline ultra-hard compact constructions of this invention can be formed using a single-type of braze material to braze together the support member and the compact, and/or to braze together the different support member portion. In an example embodiment, an active braze material can be used to braze both the compact PCD body to the support member first or side section, as well as braze together the support member sections that are adjacent the PCD body. It is to be understood that the specific type of braze material used as the single type of braze material to attach the construction can and will vary depending on such factors as the type of material used to form the polycrystalline ultra-hard compact, the type of material used to form the support member, and the ultimate end-use application.

Alternatively, polycrystalline ultra-hard compact constructions of this invention can be formed using two or more different types of braze materials to further suppress unwanted void formation and increase the strength of the resulting construction. For example, a first type of braze material can be used to join the compact PCD body to one support member section, while another type of braze material can be used to join the compact substrate to another support member section, and/or to join different portions of the support member together. In such an example, it may be desirable to use an active braze material to join the compact PCD body to the respective support member section, and use a nonactive braze material to join the compact substrate to the respective support member section and/or to join support member portions together. In this example, the active braze material will react with and form a strong bond with the compact PCD body, which is desired for the purpose of improving the bond strength of the compact PCD body within the construction.

The different braze materials used in these constructions can be selected on the basis of the being active or nonactive and/or on the basis of the melting (liquidus) temperatures and/or solidifying (solidus) or crystallizing temperatures of the braze materials. For example, it may be desirable to use a braze material, having a relatively high melting temperature (high crystallization temperature), for joining the compact and/or different parts of the compact to a support member, and use relatively lower melting temperature (lower crystallization temperature) braze material for joining the support members together. During the brazing process the braze material is heated to its melting temperature while the components to be brazed together are held in an assembled state. Once melted, the braze material fills the spaces between the components, after that the braze material is allowed to cool. During the cooling process, the braze material undergoes crystallization, that causes a contraction of the braze material.

In this example, selecting a higher melting temperature braze material to attach the compact to a support member will cause such braze material to crystallize first during cooling while the relatively lower melting temperature braze material is still in a liquid phase. This selective choice of using different melting temperature braze materials enables the compact to be attached to the support member without resistance from the other support members, which resistance to movement can cause an unwanted formation of residual thermal stress within the construction. As the assembly continues to cool, the lower melting point braze material undergoes crystallization and forms a desired attachment between the support members.

Thus, a feature of polycrystalline ultra-hard compact constructions of this invention is that they permits the selective use of different types of braze materials to both provide an improved bond strength with the compact and/or the different parts of the compact and further avoids the unwanted creation of residual thermal stresses within the resulting construction.

Thus, it is to be understood that the polycrystalline ultra-hard compact constructions described herein and illustrated in the figures can be formed using a single-type of braze material, or can be form using two or more different types braze materials. It is to be understood polycrystalline ultra-hard compact constructions can be formed using a variety of different types of braze materials to form attachments between a number of different adjacent compact body and support member surfaces, and that all such available variations formed by using such different types of braze materials are within the scope of this invention.

The materials useful for forming the support member or portions thereof according to principles of this invention include those capable of providing a desired level of structural strength and rigidity to the construction to thereby enable attachment and use of the construction with a desired cutting and/or wear device. It is also desired that the support member used to form constructions of this invention be made from materials having properties that facilitate attachment to one another and to the compact by brazing process or the like. Further, it is desired that the materials used to form the support member enable the construction to be attached to the end use cutting and/or wear device by conventional method, e.g., by brazing or welding or the like.

Suitable materials useful for making support members include, and are not limited to, carbides, nitrides, carbonitrides, ceramic materials, metallic materials, ultra-hard materials such as those including diamond and/or cubic boron nitride components, cermet materials, and mixtures, combinations, and alloys thereof. Materials useful for forming the support members can be selected from the same general types of materials used to form substrates for conventional PCD materials, or used to form substrates for conventional thermally stable polycrystalline diamond compact constructions, including cermet materials such as cemented tungsten carbide.

In addition to having the ability to use different types of brazing materials when forming constructions of this invention, such constructions can also be formed by using a support member having two support portions that are made from the same or different types of materials. For example, constructions of this invention can be formed having a support member or portions forming the same that are all formed from the same material. In the example where the support member is of a unitary construction, it will be formed from the same material. In the example where the support member is formed from two separate portions, such portions can be formed from different materials to provide a further variant that can be adjusted for providing constructions having improved bond strength and reduced residual thermal stress.

When using the term "different" in reference to materials used to form both the braze material and materials used to form support member portions, it is to be understood that this includes materials that generally include the same constituents, but may include different proportions of the constituents and/or that may include differently sized constituents, wherein one or both such features operate to provide a different mechanical and/or thermal property in the material.

Polycrystalline ultra-hard compact constructions of this invention are specially engineered to include a support member, that can be of an integral or multi-piece construction and that can be made from the same or different material, and that can be attached to one another and to the compact using the same or a different braze material. Constructions configured in this manner enable a designer to vary one or more of these features for the purpose of achieving a desired improvement in bond strength, and/or a desired reduction in residual thermal stress, and/or a desired reduction in stress concentrations within the construction to meet the needs of different end-use applications. Further, polycrystalline ultra-hard compact constructions of this invention can be attached by conventional methods, such as by brazing, welding or the like, to a variety of different end-use application devices.

Polycrystalline ultra-hard compact constructions of this invention can be used in a number of different applications, such as tools for mining, cutting, machining, milling and construction applications, wherein properties of thermal stability, and/or wear and abrasion resistance, mechanical strength, reduced thermal residual stress, and reduced stress concentrations are highly desired. Polycrystalline ultra-hard compact constructions of this invention are particularly well suited for forming working, wear and/or cutting elements in machine tools and drill and mining bits such as roller cone rock bits, percussion or hammer bits, diamond bits, and shear cutters used in subterranean drilling applications.

Figure 5:
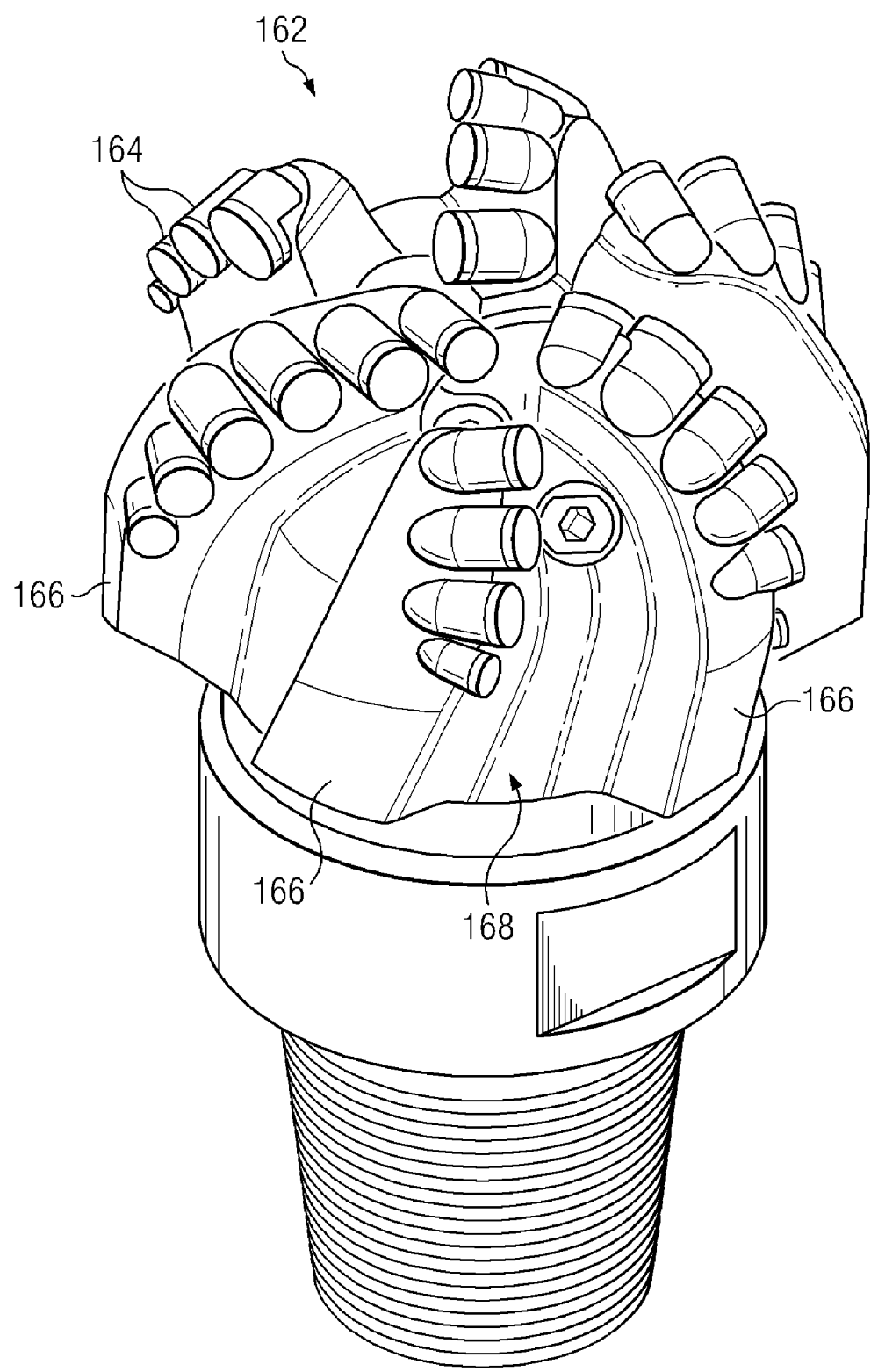
FIG. 5 is a perspective side view of a drag bit comprising a number of polycrystalline ultra-hard compact constructions of the invention provided in the form of shear cutters.

FIG. 5 illustrates a drag bit 162 comprising a plurality of cutting elements made from polycrystalline ultra-hard compact constructions of this invention configured in the form of shear cutters 164. The shear cutters 164 are each attached to blades 166 that extend from a head 168 of the drag bit for cutting against the subterranean formation being drilled. The shear cutters 164 are attached by welding or brazing technique to the blades and are positioned to provide a cutting surface.

Figure 6:
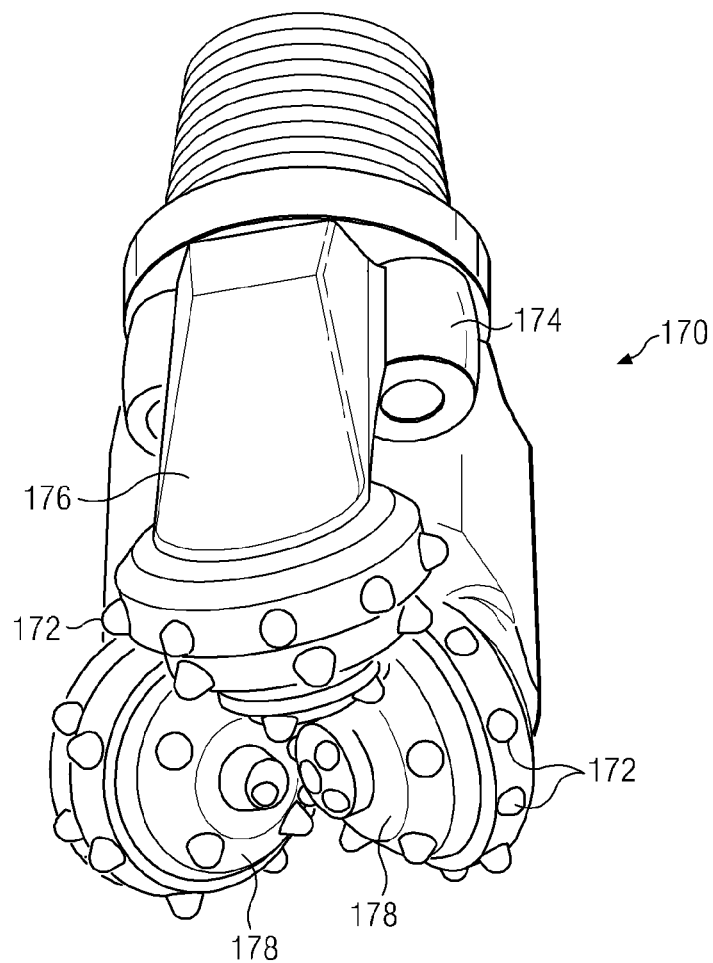
FIG. 6 is a perspective side view of a rotary cone drill bit comprising a number of polycrystalline ultra-hard compact constructions of this invention provided in the form of inserts.

FIG. 6 illustrates a rotary or roller cone drill bit in the form of a rock bit 170 comprising a number of polycrystalline ultra-hard compact constructions of this invention provided in the form of wear or cutting inserts 172. The rock bit 170 comprises a body 174 having three legs 176, and a roller cutter cone 178 mounted on a lower end of each leg. The inserts 172 can be formed according to the methods described above. The inserts 172 are provided in the surfaces of each cutter cone 178 for bearing on a rock formation being drilled.

Figure 7:
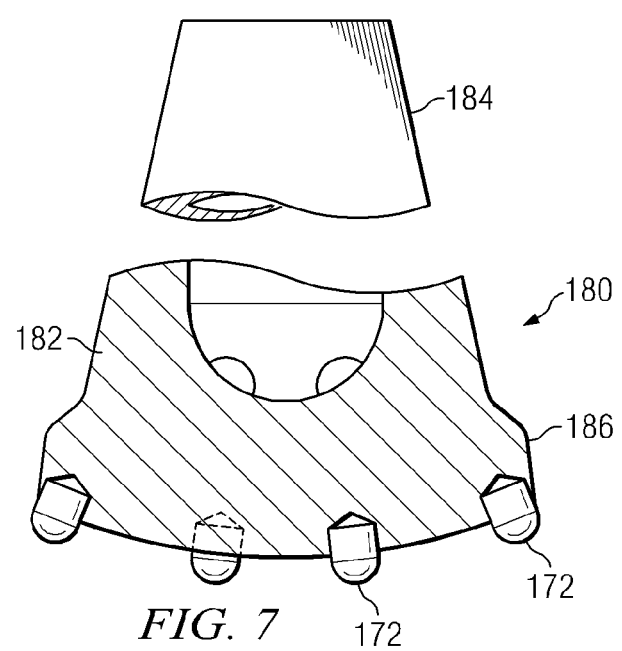
FIG. 7 is a perspective side view of a percussion or hammer bit comprising a number of polycrystalline ultra-hard compact constructions of this invention provided in the form of inserts.

FIG. 7 illustrates the inserts described above as used with a percussion or hammer bit 180. The hammer bit comprises a hollow steel body 182 having a threaded pin 184 on an end of the body for assembling the bit onto a drill string (not shown) for drilling oil wells and the like. A plurality of the inserts 172 is provided in the surface of a head 186 of the body 182 for bearing on the subterranean formation being drilled.

Other modifications and variations of polycrystalline ultra-hard compact constructions comprising a polycrystalline ultra-hard compact attached to a support member configured in the manner described above with reference to the figures will be apparent to those skilled in the art. It Is, therefore, to be understood that within the scope of the appended claims, this invention may be practiced otherwise than as specifically described.

What is claimed is:

1. A polycrystalline ultra-hard compact construction comprising:
   a polycrystalline ultra-hard compact having a polycrystalline ultra-hard body that is joined directly to a substrate, wherein the ultra-hard body comprises a material microstructure of bonded together ultra-hard particles; and
   a support member that is attached to a surface of the compact by a braze material, the support member comprising:
      a first section that extends axially along and that is attached to a wall surface of the compact;
      a second section that extends radially along and that is attached to a back side surface of the substrate of the compact; and
      a third section that extends radially along and that is attached to a front side surface of the ultra-hard body of the compact;
   wherein the support member comprises one or more materials having a greater thermal expansion property than the compact such that the compact is in a state of axial compression within the support member.

2. The construction as recited in claim 1 wherein the support member first section extends circumferentially around about 50 percent or less of surface of the compact.

3. The construction as recited in claim 1 wherein the support member first section extends circumferentially around greater than 50 percent of surface of the compact.

4. The construction as recited in claim 1 wherein the second section covers from about 30 to 100 percent of the backside surface of the compact.

5. The construction as recited in claim 1 wherein the third section covers from about 30 to 100 percent of the front side surface of the compact.

6. The construction as recited in claim 1 wherein the support member is of a one-piece/unitary construction.

7. The construction as recited in claim 1 wherein one of the support member first, second or third sections are not integral with the remaining sections.

8. The construction as recited in claim 1 comprising more than one type of braze material interposed between the compact and the support member.

9. The construction as recited in claim 1 wherein the compact comprises a polycrystalline diamond body and a substrate that is formed from a cermet material.

10. A bit for drilling subterranean earthen formations comprising a body and a number of cutting elements attached thereto, wherein at least one of the cutting elements comprises the construction as recited in claim 1, and wherein the support member is attached to the bit.

11. A polycrystalline diamond compact construction comprising:
    a polycrystalline diamond compact having a polycrystalline diamond body that is attached to a substrate, wherein the polycrystalline diamond body comprises a material microstructure of bonded together diamond particles; and
    a support member that is attached to the compact by a braze material, the support member comprising:
       a first section that extends axially along and that is attached to a wall surface of the compact;
       a second section that extends radially along and that is attached to a back side surface of the substrate of the compact; and
       a third section that extends radially along and that is attached to a front side surface of the polycrystalline diamond body of the compact;
    wherein the support member comprises one or more materials having a greater thermal expansion property than the compact such that the compact is in a state of axial compression within the support member.

12. The construction as recited in claim 11 wherein the support member first, second and third sections are integral with one another, and the support member is a one-piece construction.

13. The construction as recited in claim 11 wherein the body is formed from polycrystalline diamond that is substantially free of a catalyst material.

14. The construction as recited in claim 11 wherein the support member first section extends circumferentially along about 50 percent or less of the compact all surface.

15. The construction as recited in claim 11 wherein the support member second section extends along about 30 to 100 percent of the compact backside surface.

16. The construction as recited in claim 11 wherein the support member third section extends along about 30 to 100 percent of the compact front side surface.

17. A bit for drilling earthen subterranean formations comprising a plurality of cutting elements attached thereto, wherein at least one of the cutting elements comprises the construction as recited in claim 11, and wherein the support member is attached to the bit.

18. The construction as recited in claim 11 wherein the substrate is selected from the group of materials consisting of ceramics, metals, cermets, and combinations thereof.

19. A polycrystalline ultra-hard compact construction prepared by the process of:

forming a polycrystalline diamond compact by subjecting a volume of precursor diamond grains to high pressure/high temperature conditions in the presence of a catalyzing material and a substrate material, wherein the resulting compact comprises a polycrystalline diamond body joined with the substrate, wherein the polycrystalline diamond body comprises a material microstructure of bonded together diamond particles;

attaching a support member to the compact by the use of a braze material, wherein the support member includes a first section that extends axially along the compact and at least partially covers a circumferential surface of the compact; a second section that extends radially along and that is attached to a back side surface of the substrate of the compact; and a third section that extends radially along and that is attached to a front side surface of the polycrystalline diamond body of the compact; wherein the support member comprises one or more materials having greater thermal expansion property than the compact such that the compact is in a state of axial compression within the support member.

20. The construction as recited in claim 19 wherein during the process of attaching, the second section is attached to the backside surface of the compact by use of a braze material.

21. The construction as recited in claim 19 wherein during the process of attaching, the support member second section is separate from the first section and is attached thereto by the use of a braze material.

22. The construction as recited in claim 21 wherein during the process of attaching, different braze materials can be used to attach the support member to the compact than that used to attach the support member sections together.

23. The construction as recited in claim 19 wherein during the process of attaching, the second section and third section are attached to respective front side and backside surfaces of the compact by use of a braze material.

24. A bit for drilling subterranean earthen formations comprising a body and a number of blades projecting outwardly from the body, the bit further comprising a number of cutting elements that are attached to the blades, wherein the cutting elements include a polycrystalline diamond compact construction comprising:
  a polycrystalline diamond body and a substrate that is attached to the body, wherein the polycrystalline diamond body comprises a material microstructure of bonded together diamond particles; and
  a support member attached to the bit and interposed between the bit and the compact, wherein the support member is brazed to the compact and is attached to the bit, wherein the support member includes sections that extend radially along a front side of the polycrystalline diamond body and back side surface of the substrate of the compact;
  wherein the support member comprises one or more materials having a greater thermal expansion property than the compact such that the compact is in a state of axial compression within the support.

25. The bit as recited in claim 24 wherein the support member includes a section that extends axially along a length of the compact and at extends circumferentially around about 50 or less of an outside wall surface of the compact.

26. The bit as recited in claim 24 wherein the support member sections extend radially along 30 to 100 percent of the compact front side and back side surfaces.

27. The bit as recited in claim 24 comprising different braze materials between the compact and support member.

28. The bit as recited in claim 24 wherein the support member is a one-piece construction.

29. The bit as recited in claim 24 wherein the body is substantially free of a catalyst material.

\* \* \* \* \*